US012754866B1

(12) United States Patent
Khandelwal et al.

(10) Patent No.: US 12,754,866 B1
(45) Date of Patent: Oct. 6, 2026

(54) SMART CABLE WITH HETEROGENOUS PRIMARY/SIDEBAND COMMUNICATION CHANNELS

(71) Applicant: Astera Labs, Inc., Santa Clara, CA (US)

(72) Inventors: Pulkit Khandelwal, Cupertino, CA (US); Gil Tal, Ben Ami (IL); Roman Kuznitzov, Kiryat Yam (IL)

(73) Assignee: Astera Labs, Inc., San Jose, CA (US)

( * ) Notice: Subject to any disclaimer, the term of this patent is extended or adjusted under 35 U.S.C. 154(b) by 0 days.

(21) Appl. No.: 18/978,424

(22) Filed: Dec. 12, 2024

Related U.S. Application Data

(60) Provisional application No. 63/687,713, filed on Aug. 27, 2024.

(51) Int. Cl.
*G06F 13/40* (2006.01)

(52) U.S. Cl.
CPC ...... *G06F 13/4022* (2013.01); *G06F 13/4027* (2013.01); *G06F 13/4068* (2013.01)

(58) Field of Classification Search
CPC ..... G06F 3/4022; G06F 3/4027; G06F 3/4061
See application file for complete search history.

(56) References Cited

U.S. PATENT DOCUMENTS

| | | | | | |
|---|---|---|---|---|---|
| 2,019,026 | A * | 10/1935 | Spear | H02K 7/1815 74/606 R |
| 10,353,853 | B1 * | 7/2019 | Khamesra | G06F 13/362 |
| 2016/0029464 | A1 * | 1/2016 | Hughes | H05B 47/1985 315/131 |
| 2017/0039162 | A1 * | 2/2017 | Mishra | G06F 13/385 |
| 2022/0029649 | A1 * | 1/2022 | Epstein | H04B 1/04 |
| 2022/0156220 | A1 * | 5/2022 | Mishra | G06F 13/385 |
| 2022/0179814 | A1 * | 6/2022 | Mishra | G06F 13/385 |
| 2024/0111705 | A1 * | 4/2024 | Lewis | G06F 8/65 |

FOREIGN PATENT DOCUMENTS

WO WO-2024076823 A1 * 4/2024 ......... G06F 13/4282

OTHER PUBLICATIONS

Common Management Interface Specification (CMIS) Revision 5.2, Optical Internetworking Forum (OIF), Apr. 27, 2022, 344 pages.

* cited by examiner

*Primary Examiner* — Henry Tsai
*Assistant Examiner* — Christopher A Daley
(74) *Attorney, Agent, or Firm* — Charles Shemwell

(57) ABSTRACT

Heterogenous primary and sideband communication channels are implemented between smart-cable modules integrated within counterpart connectors of an active electrical cable.

22 Claims, 4 Drawing Sheets

FIG. 1 Smart cable with heterogenous communication channels – primary and sideband

SMART CABLE WITH HETEROGENOUS PRIMARY/SIDEBAND COMMUNICATION CHANNELS

BRIEF DESCRIPTION OF THE DRAWING

The various embodiments disclosed herein are illustrated by way of example, and not by way of limitation, in the figures of the accompanying drawings and in which like reference numerals refer to similar elements and in which.

DETAILED DESCRIPTION

Figure 1:
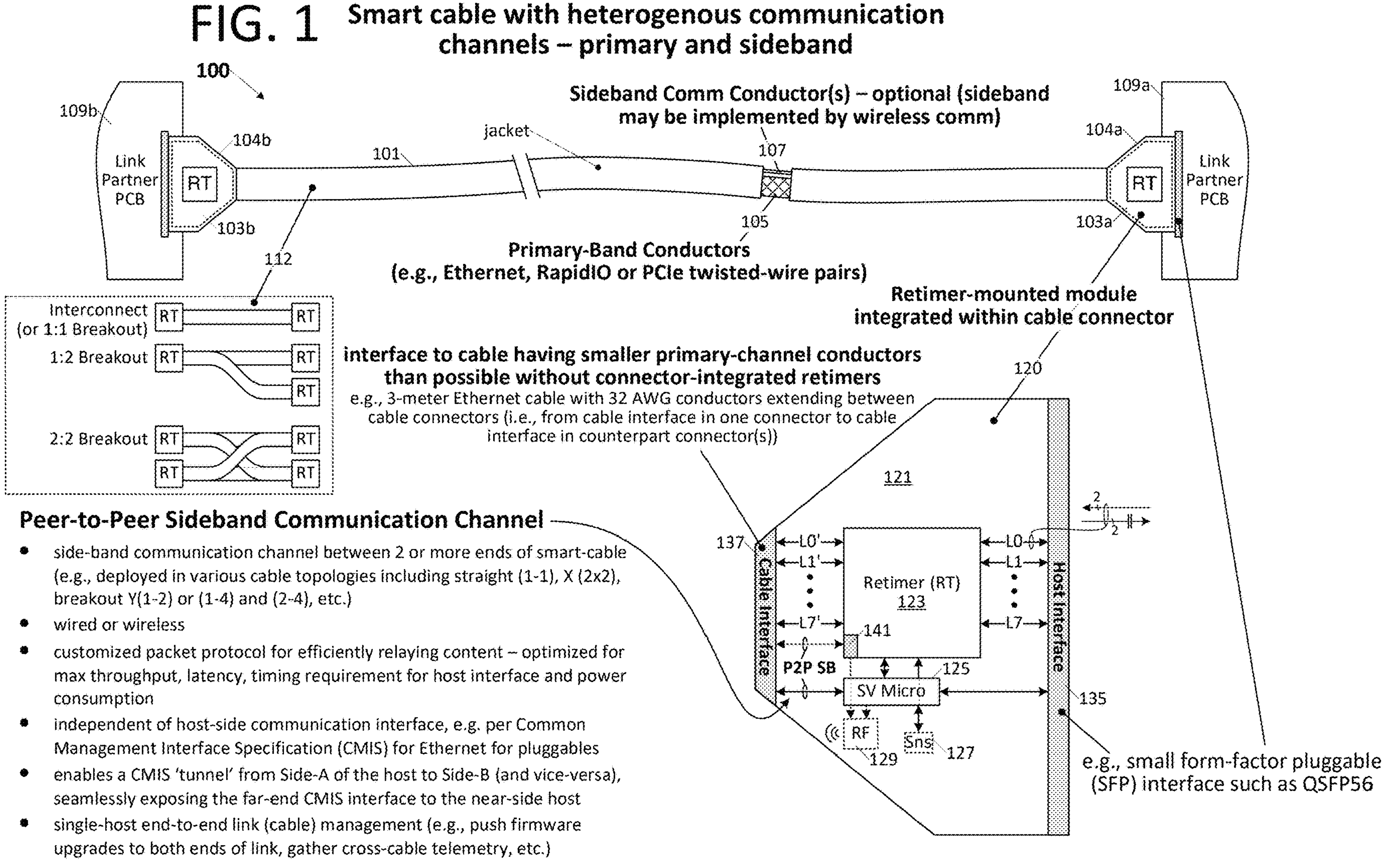
FIG. 1 illustrates an embodiment of a dual-channel active electrical cable or "smart-cable" having an electrically conductive trunk that extends between at least two smart-cable modules integrated within respective endpoint connectors.

In various embodiments herein, heterogenous primary and sideband communication channels are implemented between smart-cable modules integrated within counterpart connectors of an active electrical cable. In a number of embodiments, integrated-circuit retimers disposed respectively on/within the smart-cable modules implement a high-bandwidth, low-latency primary cross-cable communication channel in accordance with one or more standardized communications protocols (e.g., Ethernet, Peripheral Component Interconnect express (PCIe), RapidIO, etc.), while supervisory circuitry within or partly/completely separate from the retimer implements a lower-bandwidth sideband channel that enables end-to-end smart-cable management. In one implementation, for example, each integrated-circuit retimer ("retimer IC") includes primary-channel re-timer circuitry (such that two cable-integrated retimers effect a re-timed cross-cable primary signaling link between counterpart cable-connected host devices) while sideband communication circuitry (e.g., a programmed supervisory microcontroller) disposed together with the retimer IC on a smart-cable module enables wired or wireless sideband communication (i.e., consuming no bandwidth within the primary communication channel) with one or more counterpart cable-integrated sideband communication units. In some embodiments the sideband communication circuitry is coupled to one or more supporting components (e.g., radio-frequency transceiver ICs implemented in accordance with one or more wireless communications standards such as Bluetooth LE, Zigbee, Z-Wave, WiFi, etc. and mounted, together with the sideband communications unit and retimer IC, on a smart-cable module), with the sideband communications unit and supporting component(s) collectively implementing the sideband communication channel (i.e., communicating with counterpart sideband communications unit and supporting components at far end of the cable). In other embodiments, wired or wireless communication circuitry is integrated entirely within the sideband communications unit (e.g., supervisory microcontroller IC or retimer IC) and, in the case of wired sideband communications, coupled to sideband communication circuitry within the counterpart retimer(s) via one or more cross-cable conductors—conductors separate/distinct from those used to implement the wired primary communications channel. In all embodiments, the sideband communication channel may be implemented together with a management interface (e.g., compliant with a management interface standard such as the common management interface specification, CMIS, or any other interface that allows a host device to access and manage information regarding component status, performance, and/or diagnostics through a standardized communication protocol; essentially acting as a register to store and retrieve key data points about the component) that enables cross-cable management of cable-integrated retimers and/or supporting circuitry. In a number of implementations, for example, the sideband communication circuitry implements a register set in compliance with the CMIS specification to enable a cable-connected host device to manage various operational aspects of the entire smart cable, including implementing strategic firmware updates within cable-integrated retimers (or, more generally, within the smart-cable modules (SCMs) on which the retimers are mounted) at both/all ends of the cable, including implementing firmware updates with respect to one or more signaling lanes of the primary communication channel (temporarily rendering those lanes inoperable for mission-mode communications) while one or more other primary-channel signaling lanes remain active for mission-mode signaling.

FIG. 1 illustrates an embodiment of a dual-channel active electrical cable or "smart-cable" 100 having an electrically conductive trunk 101 that extends between at least two smart-cable modules 103*a*, 103*b* integrated within respective endpoint connectors 104*a*, 104*b*. In the depicted example, the dual channels—heterogenous primary and sideband communication channels—are implemented by respective sets of one or more wired electrical conductors (105, 107, respectively), with the primary channel implemented, for example, by multiple sets of twisted wire pairs (e.g., copper) that form respective bidirectional signaling lanes in accordance with a standardized high-bandwidth communication standard (e.g., Ethernet, PCIe, RapidIO, etc.) while the sideband channel is implemented by one or more conductors 107 that support relatively low-bandwidth signaling (i.e., substantially lower bandwidth than the primary channel) according to a proprietary or standards-based protocol, the latter being compliant with any of various interface/communication standards including, for example and without limitation, inter-integrated circuit (I2C), improved inter-integrated circuit (I3C), serial peripheral interface (SPI), universal asynchronous receiver-transmitter (UART, including RS232 signaling via UART components), and so forth. In other embodiments, the sideband communication channel may be implemented by wireless (radio-frequency) communications in accordance with various standardized radio-frequency (RF) communication protocols (e.g., Bluetooth LE, Zigbee, Z-Wave, Near-Field communication (NFC), WiFi, etc.) as may be sufficient for a given signaling application (e.g., cable length, power constraints, etc.). In either case, wired or wireless sideband communications, smart-cable 100 may implement a 1:1 interconnect (i.e., coupled between two host devices/link partners as shown at 109*a*, 109*b*) or 1:1 breakout, or 1:2 breakout (Y-type cable), 2:2 breakout (X-type cable)—options shown, for example, in detail view 112—or any other practicable/useful interconnect or breakout configuration (e.g., 2:4 Y, 4:4 X, etc.). In all embodiments presented herein, wired primary and/or sideband communication channels may be implemented by one or more optical conductors (e.g., fiber optic) instead of or in addition to electrical conductors.

Referring to FIG. 1 detail view 120, each connector-integrated module 103*a*/103*b* (also referred to herein as a smart cable module (SCM)) includes a paddle card (printed circuit board or other substrate form-factored for integration within cable-connector housing) having one or more IC components mounted thereto, including for example and without limitation, a retimer IC 123 ("RT"), supervisory microcontroller IC 125, one or more sensor ICs 127 (e.g., temperature, voltage, motion, proximity, etc.), discrete RF communications IC 129 and various other components not specifically shown (e.g., power-management IC, oscillator, code storage for supervisory microcontroller and/or retimer, etc.). In all cases, various discretely depicted components (and any not specifically shown) may be integrated within retimer IC 123 (e.g., temperature sensor, RF communications circuitry, supervisory microcontroller circuitry, etc. implemented within retimer IC rather than as discrete components), and the retimer IC itself may be implemented by a system-on-chip (SoC), system-in-package, three-dimensional IC (3DIC) or any other practicable multi-die integrated circuit component.

In the heterogenous dual-channel embodiment of FIG. 1, the sideband communication channel enables link-management-level communication between counterpart smart-cable modules 103*a*/103*b* (collectively SCMs 103) that may otherwise be difficult or infeasible where the primary channel is dedicated to conveying host traffic (i.e., having no or negligible spare bandwidth) as is typically the case, for example, with a primary channel implemented in accordance with any of various IEEE 802.3 Ethernet standards and/or where the primary channel is down (i.e., inoperative or otherwise unable to convey traffic). In the latter case, the sideband channel can convey information necessary to diagnose the failure and/or re-establish the link (e.g., enabling negotiation of a reduced primary-link signaling speed that may be used to bootstrap operation of the primary link, with higher signaling rates negotiated via the primary channel thereafter.

In a number of embodiments, the side-band channel is implemented as a peer-to-peer communication channel that may be deployed between various ends (two or more) of smart-cable 100 (i.e., according to cable topology and including, without limitation, 1:1 interconnect, 1:1 breakout, 1:N breakout, M:N breakout or N:N breakout configurations, where 'M' and 'N' are integers greater than one). As discussed above, the side-band communication channel may be wired (including fiber-optic or other optically-conductive cabling) or wireless. In either implementation, the sideband channel may operate in compliance with a standardized or proprietary/customized protocol to efficiently relay content and may be optimized to meet throughput, latency and power requirements of a given application—including dynamically scaling throughput (e.g., reducing bandwidth) to conserve power in accordance with host and/or smart-cable power modes (e.g., reducing to low-power mode to conserve power, particularly in a portable battery-powered application and/or to meet emergency power-reduction requirements). The sideband communication channel may be entirely independent from the host-side communication interface (or at least independent from the host-side interface to the primary communication channel) and may be implemented in compliance with a standardized management interface, such as a management interface according to any of the Common Management Interface Specifications (CMIS), including those for Ethernet pluggable devices. Accordingly, the sideband channel may enable a CMIS "tunnel" from one side of smart cable 100 to any or all others (e.g., from the SCM 103 and/or host at one end of the cable to the SCM and/or host at the other) through which various link management tasks may be carried out without impacting (or minimizing impact upon) primary channel availability/bandwidth. As an example, the CMIS tunnel (effected via the sideband communication channel) may enable a single host at one terminus of the smart-cable to push firmware upgrades to the SCMs (and/or remote host) at both (or more generally all) ends of the link, gather cross-cable status/telemetry and otherwise carry out any useful link management operations. For example, the sideband communication channel enables a single host entity to manage data path/link configurations on both ends of the smart cable (i.e., within both cable-connected hosts and within the counterpart SCMs 103), simplifying control-plane software within a data center or other installation. Cross-cable telemetry—host and/or SCM at one end of smart-cable gathering telemetry from remote end (remote SCM and/or host) and combining with near-end/local telemetry—may be used to construct wholistic link-health records/information that includes, for example and without limitation:

- dynamic and/or static electrical parameters corresponding to the link (e.g., equalization information including settings/revisions, one or more figures of merit, signal-to-noise ratio (SNR), etc.);
- continuous and/or periodic far-end/near-end calibration operations, including adaptive adjustments to calibration settings (signal drive strength, termination settings, equalization tap settings, timing calibration, etc.);
- tracking of various ambient and/or in-situ operating metrics, such as real-time voltage tracking, ambient temperature tracking, in-situ (e.g., chip) temperature tracking, and/or various measurements that may bear on system operation, including motion, orientation, proximity to other objects, voltage sources, heat sources, etc.

In all such cases, the wholistic telemetry (gathered from both ends of smart-cable at least in part via sideband communication channel) may enable host components and/or SCMs to react to conditions of interest—e.g., alert/alarm from either end of the smart-cable (e.g., voltage and/or temporal signaling margin has dropped below predetermined threshold, bit error rate (BER) above a predetermined threshold, temperature transition above/below threshold, etc.) triggering reaction within one or more host components and/or SCMs. With regard to firmware upgrades, in particular, the CMIS tunnel is applied in a number of embodiments to implement primary-channel firmware updates within counterpart retimers (e.g., retimers 123 disposed on respective SCMs 103*a*/103*b*), including iteratively pushing firmware updates to primary-channel lane controllers such that counterpart lane controllers (at opposite ends of the smart-cable and thus within retimers disposed on respective SCMs) are updated—with corresponding signaling lanes rendered temporarily inactive—without disrupting traffic flow on the remaining lanes (i.e., controllers for other lanes and the signaling lanes themselves remain fully functional/active during the firmware updates with respect to a given set of lane controllers).

As shown in detail view 120, each smart-cable module 103 includes a host interface 135 (e.g., a small-form-factor pluggable (SFP) interface such as QS5P56 or the like) cable interface 137, retimer 123, supervisory microcontroller 125 (e.g., processor and program code store), optional radio-frequency communications circuitry 129, and optional sensor circuitry 127 (e.g., one or more temperature sensors, voltage sensors, inertial-measurement sensors, etc. coupled to supervisory microcontroller 12 and/or retimer 123). Retimer 123 is disposed between respective host-side and cable-side primary-channel signaling lanes extending to the host interface and cable interface to re-time traffic over the primary channel, while supervisory microcontroller is coupled between the host-side and cable-side interfaces to implement the sideband communication channel. As shown, any or all sideband communication components—including the entirety or any portion of the supervisory microcontroller circuitry—may be integrated within retimer 123 such that retimer 123 implements a sideband communications interface as shown at 141. In either case (sideband comm implemented by supervisory microcontroller 125 or by circuitry 141 within retimer 123), the sideband communication circuitry may be coupled to one or more side-band-dedicated electrical/optical conductors via cable interface 137 and/or to wireless communication IC 129 (as discussed, circuit functions implemented within wireless communication IC 129 may be integrated in whole or part within supervisory microcontroller 125 or retimer IC 123). In the depicted example, supervisory microcontroller 125, itself coupled to the host via interface 135, may coordinate various link management operations within the local retimer 123 (and/or other "local" components co-located on the same SCM 103*a* as supervisory microcontroller 125) and also, via the sideband communication channel and counterpart supervisory microcontroller, within the remote retimer (retimer disposed on SCM 103*b*) and/or other components of the remote SCM, including minimally-disruptive primary-channel lane-control firmware updates within the local and remote retimers—management operations that, in absence of the sideband communication channel, would be difficult or infeasible without disruptive host-to-host coordination and, even then, would generally require complete shutdown of the primary channel. With regard to the primary channel, the cable-integrated retimers 123 ensure signaling integrity (e.g., meeting a specified bit error rate) over a wired primary channel having a substantially higher ratio of length to cross-sectional conductor area than otherwise possible—for example, enabling a standard 3-meter Ethernet cable to be implemented with 32 AWG (American Wire Gauge) conductors instead of conventional 24 or 26 AWG conductors or even the slim-Ethernet 28 AWG and thus enabling host interconnections (e.g., the many thousands of interconnections per data center) via smaller, lighter-weight/less cumbersome cables than otherwise possible. Accordingly, the dual heterogenous channel smart-cable enables seamless/non-disruptive cross-cable link management via the side-band communication channel and, by virtue of the re-timed primary channel, higher cable-length/conductor-diameter ratios than otherwise feasible.

Figure 2:
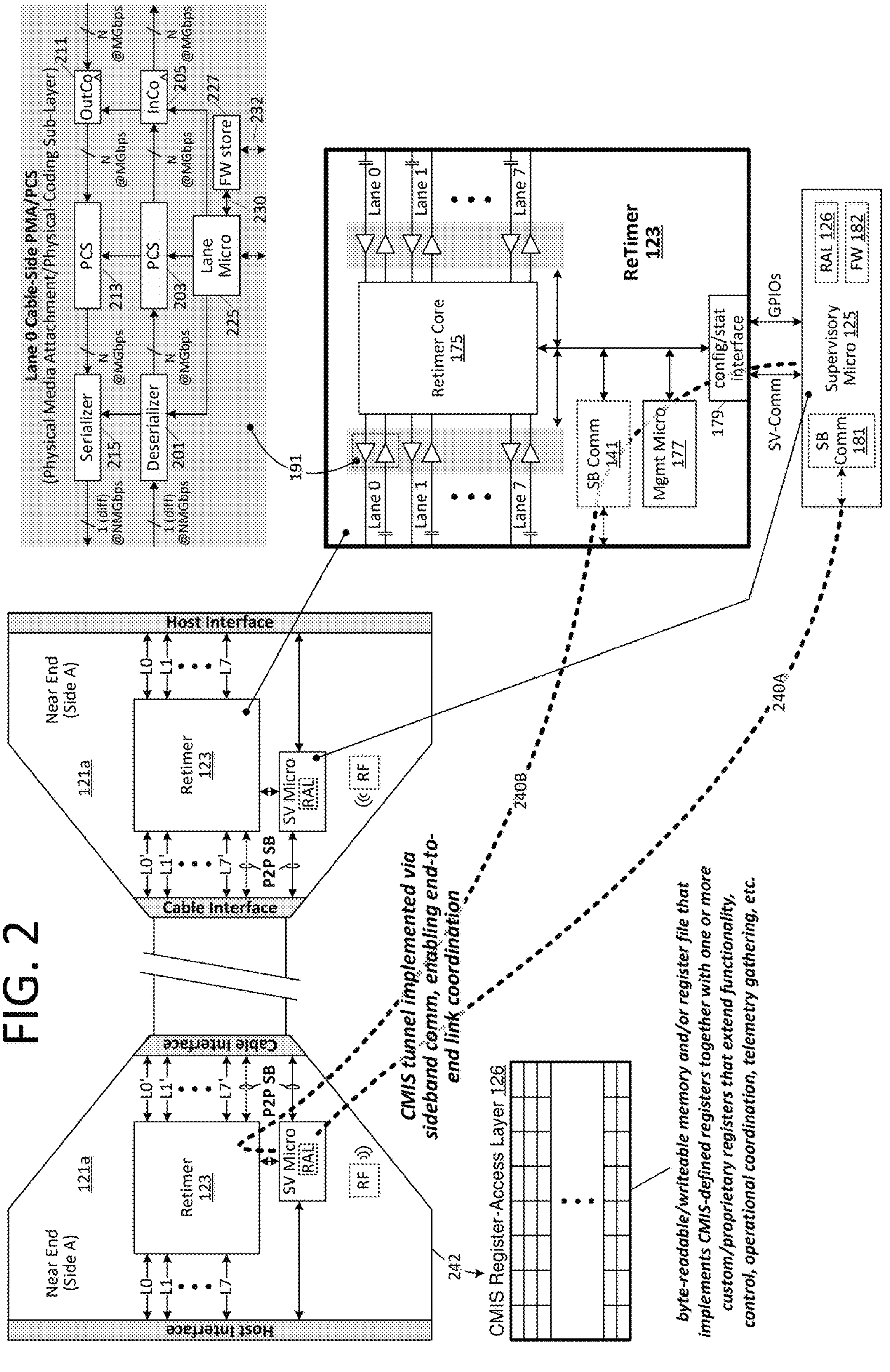
FIG. 2 illustrates exemplary detail with respect to retimer architecture and retimer-connection to a supervisory microcontroller.

FIG. 2 illustrates exemplary additional detail with respect to retimer architecture and connection to supervisory microcontroller 125. In the depicted example, each of the retimers 123 disposed on counterpart SCMs 125*a*/125 of a dual heterogenous channel smart-cable includes a retimer core 175 coupled between host-side and cable-side signaling lanes (AC-coupled in the depicted example, with capacitively-coupled interconnects in receive paths of respective signaling lanes), an optional side-band communications interface 141, a retimer management controller 177 and a configuration/status interface 179, the latter coupled to supervisory microcontroller 125 (i.e., via a protocol-compliant communication path, "SV-Comm," and/or one or more general-purpose input/outputs, "GPIOs"). As shown in detail view 191, the physical signaling circuitry for each lane (each lane constituted by a pair of unidirectional signaling links in the depicted example, with each individual link being implement, for instance, by a differential conductor pair)—includes physical media attachment/physical-coding sub-layer (PMA/PCS) circuitry that implements serialization/deserialization, coding/scrambling and data registration with respect to inbound and outbound data. For example, an inbound bit-serial data stream at N*M Gbps ('*' denoting multiplication) is deserialized (201) to yield an M-Gbps N-bit-parallel data stream that is decoded/descrambled (203) and then registered (205) for delivery to retimer core 175. Conversely, an N-bit-parallel outbound data stream is registered (211) at M Gbps upon output from the retimer core, pre-coded/scrambled (213) and then serialized (215) for transmission at N*M Gbps to destined component (e.g., to host component via the SCM host interface or to remote retimer via the SCM cable interface).

In the FIG. 2 embodiment, a PCS/PMA ("lane") microcontroller 225 (coupled to a firmware storage 227) outputs control signals/control values to the serializer/deserializer/PCS and input/output registers of the PMA/PCS block, thus permitting per-lane physical signaling control/configuration (or per lane-group control as in embodiments having a lane microcontroller per every group of Q lanes, where Q≥2). In other embodiments, the PMA/PCS control function may be implemented by a lane controller within the retimer core—that is a controller that handles core retimer functions for one or more lanes (e.g. controller per pair of lanes that can be operationally aggregated with other controllers to implement multiple independent signaling links constituted by respective subsets of lanes or a single link constituted by all inbound/outbound lanes) as well as PMA/PCS control functions on one or both sides of the retimer core. In either case, the PCS/PMA controller per lane (or per Q-lane subset) architecture permits firmware for one controller to be updated—temporarily rendering the corresponding lane or lanes inactive—while the PCS/PMA controllers for the other lanes (and the other lanes themselves) continue mission-mode transmission of host traffic. In all cases, the firmware update itself may be implemented via the PCS/PMA microcontroller (or "lane controller") and its connection (230) to the firmware storage 227 (which may be implemented in a discrete memory IC rather than integrated within the retimer IC as depicted)—the supervisory microcontroller issuing firmware write/program instructions to the PCS/PMA microcontroller which in turn programs/writes the firmware update/new code into the firmware store—or via a separate memory access port (232) accessible to the supervisory microcontroller via interface 179. As discussed below, firmware updates may be effected by writing to one code storage element/region within firmware storage 227 while the PCS/PMA microcontroller operates out of (i.e., fetches code from) another code storage element/region, switching (conceptually at least) between those two storage elements upon confirmation that the update has been correctly/completely loaded. In those and other embodiments, the different code storage elements/regions may be implemented by distinct storage regions of a given memory—for example, allocating two address-sub-ranges to the two code storage regions, one being the firmware-load target and the other containing the current execution code (previously loaded code fetched by the associated controller from instruction-pointer-sequenced addresses).

Still referring to FIG. 2, supervisory microcontroller 125 includes an optional sideband communication unit (circuit block) 181, and CMIS register set 126 (i.e., register access layer). In one embodiment, shown by dashed line 240A, the supervisory microcontroller disposed on a given SCM communicates directly with its counterpart (i.e., supervisory microcontroller on other SCM) via sideband communications unit 181 (i.e., outputting and receiving signals via a wired or wireless sideband communication channel), while in an alternative embodiment (i.e., where sideband communication circuitry is implemented with retimer 123 as shown at 141—or where all or part of the supervisory microcontroller is integrated within retimer 123) sideband communications is implemented via circuitry 141 within retimer 123, thus enabling a sideband communications channel 240B that traverses counterpart retimers 123. In either case, the sideband communication circuitry (141 and/or 181) and channel enables coordination of cross-cable firmware updates with per-lane (or per lane-group) resolution (i.e., with respect to PCS microcontroller 225) as well as updates to firmware/software for retimer management microcontroller 177 and updates to firmware/software 182 for the supervisory microcontroller itself (as discussed above, firmware/software store for a given microcontroller may be stored within a memory IC—e.g., Flash or other nonvolatile memory—separate from the microcontroller IC). In one embodiment, for example, a CMIS-compatible register access layer 126 (e.g., memory region readable/writeable with byte- or other access-granularity and that enables management operations in accordance with CMIS specification) is implemented within each of the supervisory microcontrollers (and/or data storage circuitry coupled thereto)—effecting a CMIS pathway ("CMIS tunnel" as shown at 240A/240B) that enables the counterpart controllers to push and pull (i.e., write and read) control and status information to/from one another via those registers, including exchanging control information as necessary to coordinate fractional-link firmware updates on both sides of the smart-cable (i.e., updating firmware for one or more temporarily deactivated lanes while other lanes remain in mission mode) and coordinating any other useful link management actions and/or cross-cable management communications. As shown with respect to detail 242, each register access layer implements, in addition to CMIS-defined registers, one or more custom/proprietary registers ("extension registers") that may be used to extend CMIS functionality—for example, enabling various additional control operations, operational coordination, telemetry gathering and so forth as may be beneficial in a given smart-cable application. Such extension registers may be implemented at both ends of a given CMIS tunnel (i.e., within the register-access layer in or accessible to each of counterpart controllers 125) or only at one end (or a subset of all cable-ends if there are more than two), as a given smart-cable application may require. Also, though not specifically shown, each of the supervisory microcontrollers 125 (alone or together with one or more other components disposed on a given SCM, including one or more discrete memory components) may implement remaining CMIS management protocols and operational layers and/or interfaces (e.g., management application layer, message exchange layer, data transfer layer, management signaling layer, physical interconnection layer, etc.) as necessary to enable full CMIS functionality with extensions thereof as discussed above. In other embodiments or configurations (i.e., configurations established, for example, by programmed register settings), the supervisory microcontroller on either side of the smart-cable may directly access one or more controllers (and/or code storage therefor) resident within the remote retimer via the sideband communication channel (i.e., without requiring coordination and/or communication with the counterpart supervisory microcontroller). For example, any or all of the controllers on a given SCM (i.e., supervisory microcontroller, PCS/PMA controller, retimer-management microcontroller (as shown at 177 in FIG. 2), retimer core controllers, etc.) may implement a CMIS-compatible interface that enables coordination with respect to individual link-management operations executed on either or both sides of the smart-cable—multiple CMIS tunnels between a controller on one SCM and all other smart-cable controllers, with those on the remote SCM(s) accessed via the sideband communication channel.

Figure 3:
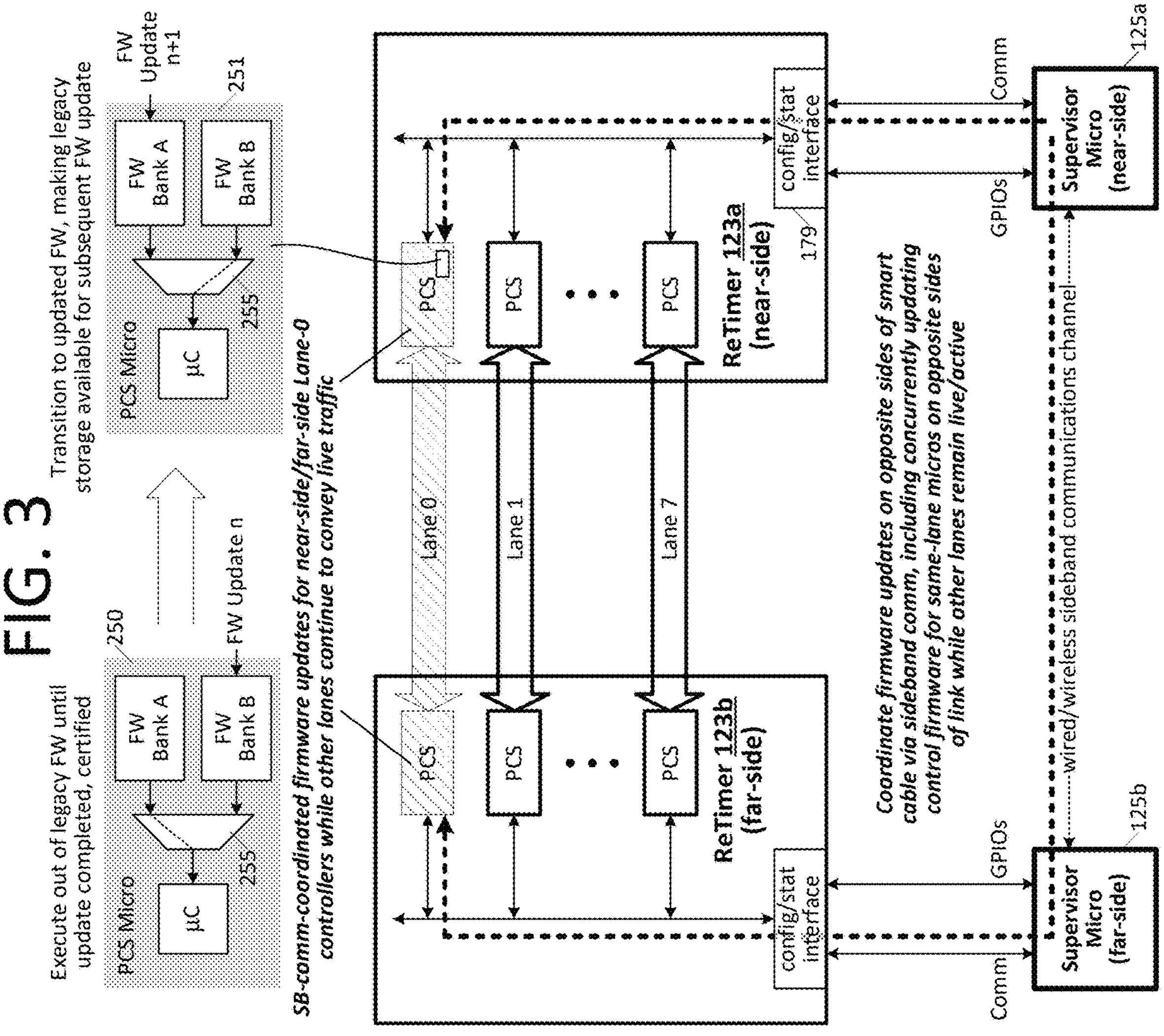
FIG. 3 illustrates an exemplary firmware update executed with respect to physical media controllers within counterpart retimers and coordinated via cross-cable sideband communication.

FIG. 3 illustrates an exemplary firmware update executed with respect to PCS controllers within counterpart retimers (i.e., "near-side" and "far-side" retimers disposed on counterpart SCMs—"near" and "far" being arbitrary designations) and coordinated via cross-cable sideband communication. In the depicted example, supervisory microcontroller 125*a* issues firmware-update instructions/data to the lane-0 (PCS/PMA) controller within near-side ("local") retimer 123*a* (via config/stat interface 179 and internal re-timer signaling path(s)) and also issues firmware-update instructions/data to the lane-0 controller within far-side re-timer 123*b* via the sideband communications channel. In one embodiment, the firmware-update instructions/data are supplied to the far-side supervisory microcontroller 125*b* (in which case the instructions/data may be limited to points or codes needed to indicate the nature of the update and the constituent lane of the primary channel targeted for update) which in turn forwards and/or issues firmware-update instructions/data to the far-side lane controller (or far-side management controller or far-side supervisory microcontroller, etc.).

In the FIG. 3 embodiment, the firmware updates are written to one firmware storage bank within or accessible to the PCS/PMA microcontroller while the microcontroller fetches (and executes) code from an alternate firmware storage bank—an arrangement shown conceptually at 250 by the multiplexed access to two different firmware storage banks (the multiplexer may form part of an address-decode circuit in an implementation of the two firmware banks as storage regions having respective address ranges in an otherwise unified memory). During a firmware switch-over interval, the subject signaling lane (i.e., lane 0 constituent of primary channel in this example) is rendered inactive followed by swapping the roles of the two firmware storage banks—in the conceptual example at 250 and 251, switching multiplexer 255 to reverse the roles of firmware storage banks A and B, establishing firmware storage bank B (updated with new firmware prior to the switchover) as the code-fetch bank, and firmware storage bank A as the target of the next ('n+1') firmware load/update operation. As shown, all other lanes remain in mission mode throughout the lane-0 firmware switchover interval, minimizing disruption/bandwidth-loss over the primary channel. Sometime after the bank A/B firmware switchover (e.g., after a time period sufficient for lane re-training and/or other management as necessary for mission-mode signaling), lane 0 is restored to active status and coordination of firmware update within counterpart controllers for another lane (or group of lanes) commences. Accordingly, the sideband communication channel enables cross-cable per-lane firmware updates (or per-lane group firmware updates) to be executed sequentially (i.e., iteratively lane by lane or lane-group by lane-group) and thus with minimum disruptive impact on primary-channel sequencing. For example, firmware updates may be implemented for all lane controllers/PCS/PMA controllers within both retimers without shutting down (disabling) the primary communication channel as some subset of constituent lanes of the primary channel remain in mission mode throughout the firmware update interval.

Figure 4:
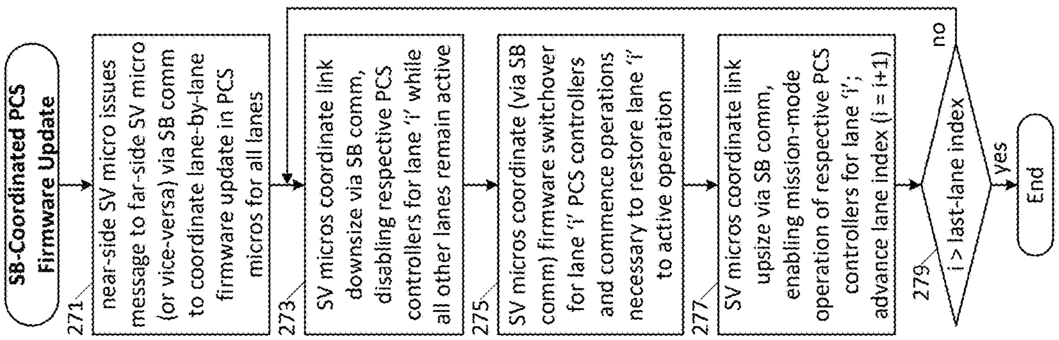
FIG. 4 illustrates an exemplary operation flow implemented via the side-band communication channel to effect sequential per-lane (or per-lane-group) firmware updates with respect to primary channel controllers during an interval throughout which the primary channel remains available for mission-mode data transfer.

FIG. 4 illustrates an exemplary operational flow implemented via the side-band communication channel to effect sequential per-lane (or per-lane-group) firmware updates with respect to primary channel controllers during an interval throughout which the primary channel remains in mission mode (one or more constituent lanes of primary channel active and available to convey host traffic at all times). Starting at 271, the near-side microcontroller messages the far-side supervisory microcontroller (via the side-band communication channel) to coordinate lane by lane (or lane-group by lane-group) firmware updates with respect to PCS/PMA microcontrollers for all lanes. In one such embodiment, for example, firmware load operations are executed with respect to all PCS/PMA controllers (or any other controllers, including retimer management microcontrollers, supervisory microcontrollers, etc.) on both sides of the smart-cable to make ready for sequential (lane by lane) firmware switchover. At 273, the counterpart supervisory microcontrollers coordinate a link downsize event, disabling lane (or lane-group) 'i' while all other lanes remain active—disabling lane 'i', for example, including disabling the counterpart PCS controllers for lane 'i' where 'i' represents the lane index and ranges between 0 and max-lane index (0-7 in the FIG. 3 example). At 275, the counterpart supervisory microcontrollers coordinate a lane 'i' firmware switchover (i.e., transitioning to the newly loaded firmware and thus completing the firmware update) and then commence operations to make ready for lane 'i' re-activation (e.g., equalization re-training, cross-cable scrambler re-synchronization, and/or restoring or re-establishing any other physical signaling controls/parametrics that may have been impacted by the lack of traffic during the firmware switchover interval and/or by the updated firmware itself). At 277, the counterpart supervisory microcontrollers coordinate a link upsize operation, restoring lane 'i' to mission mode operation (i.e., triggering/enabling mission-mode operation of the PCS/PMA controllers for lane 'i') and then advance the lane index (e.g., incrementally (i+=1) or according to any practicable heuristic or algorithmic sequencing (e.g., i=0, 7, 1, 6, 2, 5, 3, 4)). If firmware updates have been completed for all lanes (shown by "i>last-lane index" at 279 in the incremental index-advance example of FIG. 4), the sideband-coordinated firmware update is deemed to be complete. Otherwise, the operations at 273, 275, 277 are repeated, looping until firmware updates have been completed for all lanes.

Figure 5:
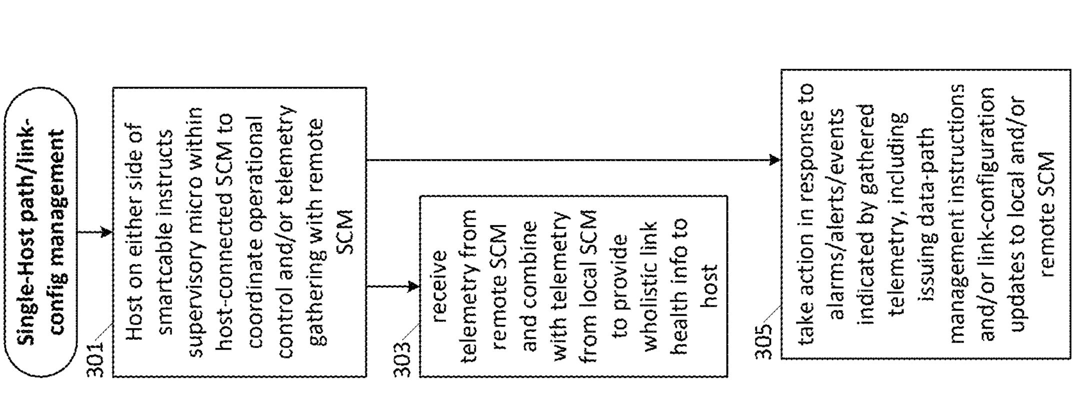
FIG. 5 illustrates exemplary use-cases supported by a smart-cable having heterogenous primary and sideband communication channels in accordance with embodiments herein.

FIG. 5 illustrates exemplary use-cases supported by a smart-cable having heterogenous primary and sideband communication channels in accordance with embodiments herein. As shown generally at 301, the sideband communication channel enables a host on either side of the smart-cable to instruct the supervisory microcontroller (or other control engine) within the local SCM to coordinate operational control activities and/or telemetry gathering with the remote SCM. With respect to telemetry gathering, the local SCM (i.e., at cable-end coupled to link-management host) issues instructions (e.g., writing to CMIS registers) as necessary to trigger telemetry gathering within the remote SCM and return transmission of that remote telemetry—as shown at 303, receiving the telemetry transmitted by the host SCM (which may include any information useful to link management/configuration and/or more generally useful to the host component managing the link, including voltage tracking, temperature tracking, information bearing on link health, etc. as discussed above) and combining the remote telemetry with telemetry gathered by or within the local SCM to provide a wholistic set of link health information to the link-management host. As shown at 305, the link-management host may take action in response to alarms, alerts, events (etc.) indicated by the collective telemetry, including issuing data-path management instructions and/or link-configuration updates to the local and/or remote SCM, the latter being transmitted to the remote SCM, for example, via the sideband communication channel.

Figure 6:
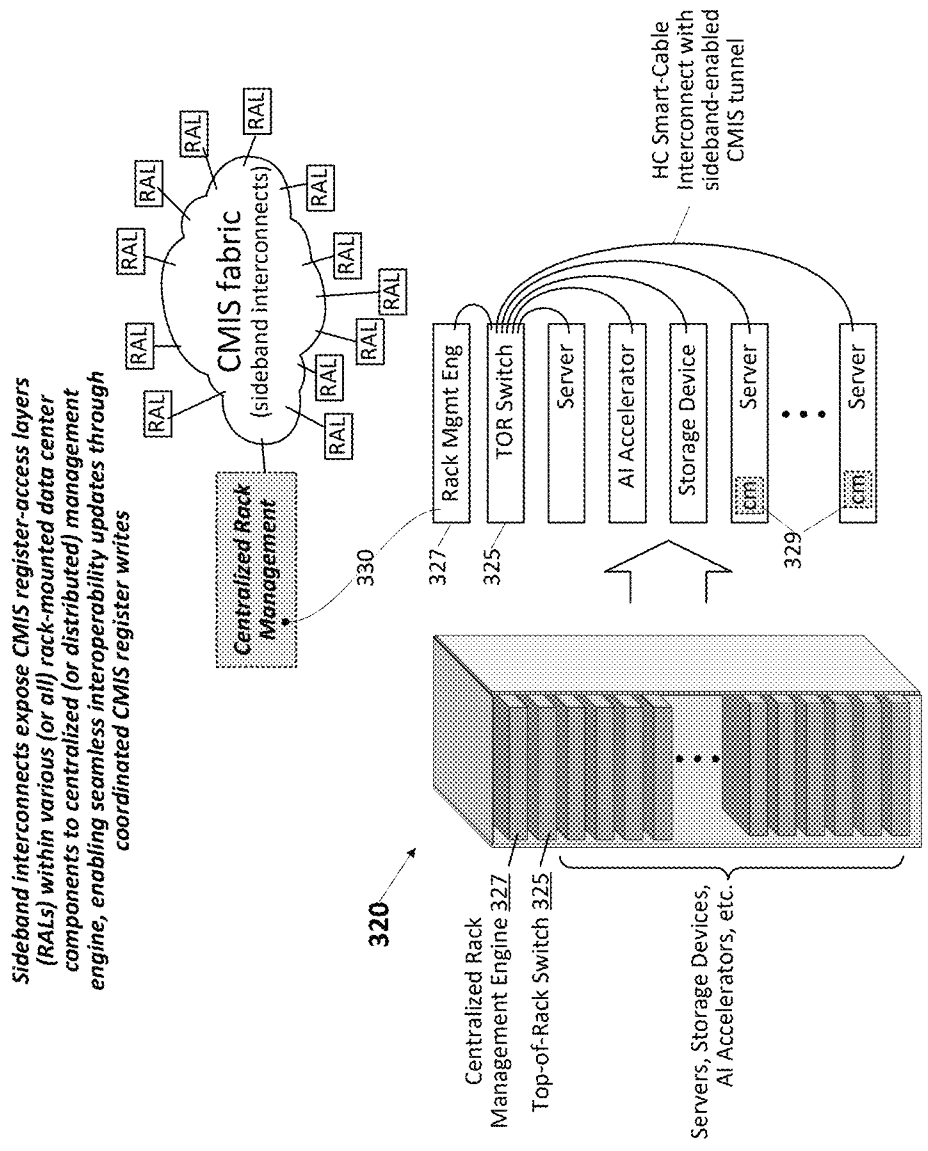
FIG. 6 illustrates extension of the through-smart-cable CMIS tunneling/management approach of FIG. 5 to a larger set of compute devices and compute-support devices.

FIG. 6 illustrates extension of the through-smart-cable CMIS tunneling/management approach of FIG. 5 to a larger set of compute devices and compute-support devices—in the FIG. 6 example, compute servers, storage devices, artificial-intelligence (AI) accelerators, etc. mounted within one or more datacenter racks 320 and interconnected via a top-of-rack (TOR) switch 325 (which switch may be implemented by multiple switches and/or disposed elsewhere within rack 320). In the depicted embodiment, sideband communications channels implemented via smart-cable interconnects between the various compute devices and compute-support devices expose CMIS register-access layers (RALs) within all rack-mounted components to centralized (or distributed) CMIS register management—for example, centralized within a rack management engine as shown at 327 (e.g., having full CMIS access as shown at 330) or distributed within one or more other rack-installed components (e.g., within one or more servers or other components as shown at 329 and such that the component 327 may be omitted or repurposed)—in either case enabling seamless interoperability updates through coordinated CMIS register writes. By this operation, otherwise siloed devices (i.e., having separate/respective operating systems that do not permit ready/simple interoperability and/or coordinated configuration update) may be dynamically configured/re-configured by rack management engine 327 (or distributed rack management as shown at 329) as necessary to overcome run-time failures (e.g., diagnosing systemic/intermittent interoperability failure, implementing remedial/corrective actions, including restoring signaling link operability), coordinate software/firmware updates and otherwise align device operating configurations so as to maximize system up-time/availability. Further, while depicted in the context of devices within a compute rack, the CMIS register exposure (or any other practicable/viable system management approach) may be readily extended to a broader network of compute devices and/or compute-support devices, enabling datacenter-wide CMIS register management and beyond (e.g., centralized or otherwise coordinated CMIS register management for all devices within a given communications network).

Referring to FIGS. 1-6 generally, any or all of circuit components discussed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply specific details not required to practice those embodiments. For example, the various cable lengths, wire gauges, smart-cable modules and constituent components thereof, conductor types conductor counts, signaling protocols and types (e.g., wired vs. wireless), implemented standards, host interface types, form-factors, integrated-circuit architectures and so forth are provided for purposes of example only—any practicable alternatives may be implemented in all cases. Similarly, signaling link parameters, protocols, configurations may be implemented in accordance with any practicable open or proprietary standard and any version of such standard. Links or other interconnection between integrated circuit devices or internal circuit elements or blocks may be shown as buses or as single signal lines. Each of the buses can alternatively be a single signal line (e.g., with digital or analog signals time-multiplexed thereon), and each of the single signal lines can alternatively be a bus. Signals and signaling links, however shown or described, can be single-ended or differential. Logic signals shown as having active-high assertion or "true" states, may have opposite assertion states in alternative implementations. A signal driving circuit is said to "output" a signal to a signal receiving circuit when the signal driving circuit asserts (or de-asserts, if explicitly stated or indicated by context) the signal on a signal line coupled between the signal driving and signal receiving circuits. The term "coupled" is used herein to express a direct connection as well as a connection through one or more intervening circuits or structures. Integrated circuit device or register "programming" can include, for example and without limitation, loading a control value into a configuration register or other storage circuit within the integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operational aspect of the device. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. An active cable comprising:

first cable conductors;

counterpart cable-connectors coupled to respective ends of the first cable conductors and having counterpart circuit modules disposed therein, the counterpart circuit modules having:

respective host-device interfaces;

respective primary communication circuits that (i) are coupled to one another via the first cable conductors, (ii) are coupled respectively to the host-device interfaces and (iii) collectively implement a primary communication channel via the first cable conductors to enable cross-cable information transfer between the respective host interfaces in accordance with a first communication protocol; and respective sideband communication circuits that collectively implement a sideband communication channel between the counterpart circuit modules via a signaling medium other than the first cable conductors, wherein the first communication protocol is heterogeneous with respect to a second communication protocol used by the sideband communication channel, such that the primary communication channel and the sideband communication channel operate according to respective distinct and non-identical communication protocols.

2. The active cable of claim 1 further comprising one or more additional cable conductors coupled between the respective sideband communication circuits to implement the signaling medium other than the first cable conductors.

3. The active cable of claim 2 further comprising a cable jacket through which the first cable conductors and the one or more additional cable conductors extend.

4. The active cable of claim 2 wherein the first cable conductors comprise electrical conductors and the one or more additional cable conductors comprise one or more electrical conductors.

5. The active cable of claim 2 wherein the first cable conductors comprise at least twice as many individual conductors as the one or more additional cable conductors.

6. The active cable of claim 1 wherein the respective sideband communication circuits collectively implement, as the sideband communication channel, a wireless radio-frequency (RF) communication channel and the signaling medium other than the first cable conductors comprises any medium through which RF electromagnetic waves may propagate, including ambient space between the respective sideband communication circuits.

7. The active cable of claim 6 wherein the first communication protocol is compliant with one or more IEEE 802.3 Ethernet standards and wherein the respective sideband communication circuits include circuitry to convey information via the wireless RF communication channel in accordance with a wireless communication standard.

8. The active cable of claim 1 wherein the respective primary communication circuits are implemented, at least in part, within respective retimer integrated circuits (ICs) that are disposed respectively on the counterpart circuit modules and that transmit and receive information to/from one another via the first cable conductors to implement the primary communication channel.

9. The active cable of claim 8 wherein the retimer IC disposed on one of the counterpart circuit modules comprises circuitry to descramble blocks of information received from the other of the retimer ICs via the primary communications channel and then to re-scramble and transmit corresponding blocks of information via the host-device interface of the one of the counterpart circuit modules.

10. The active cable of claim 8 wherein each of the retimer circuits comprises a plurality of code-executing controllers dedicated to respective sets of one or more constituent signaling lanes of the primary communication channel and coupled to respective code storage circuits from which the code-executing controllers fetch executable code, and wherein the sideband communication circuits respectively comprise circuitry to coordinate, via the sideband communication channel, storage of updated executable code within the respective code storage circuits.

11. The active cable of claim 10 wherein the circuitry to coordinate storage of updated executable code within the respective code storage circuits comprises circuitry to coordinate sequential switchover to the updated executable code as the source of the executable code fetched by the code-executing controllers such that interruption of signaling on one of the respective sets of one or more constituent signaling lanes by virtue of switchover to the updated executable code as the source of the executable code fetched by the corresponding code-executing controller occurs during an interval during which signaling on the remaining constituent signaling lanes continues.

12. A smart-cable module to be disposed in counterparts within respective connector housings of an active cable, the smart-cable module comprising:

an electrical connector to be connected to a counterpart electrical connector of a host device;

a cable-conductor interface to be connected to first cable conductors that extend between the respective connector housings;

primary communication circuitry coupled between the electrical connector and the cable-conductor interface to implement, at least in part, a cross-cable a primary communication channel via the first cable conductors in accordance with a first communication protocol; and sideband communication circuitry that implements, at least in part, a cross-cable sideband communication channel via a signaling medium other than the first cable conductors, wherein the first communication protocol governing the primary communication channel is heterogeneous with respect to a second communication protocol governing the sideband communication channel, such that the primary communication channel and the sideband communication channel operate according to respective distinct and non-identical communication protocols.

13. The smart-cable module of claim 12 wherein the cable-conductor interface includes sideband interconnects to be coupled to one or more additional cable conductors that extend between the respective connector housings and constitute, at least in part, the signaling medium other than the first cable conductors, and wherein the sideband communication circuitry is coupled to the sideband interconnects.

14. The smart-cable module of claim 13 wherein:

the sideband interconnects comprise electrical interconnects; and primary-channel interconnects, included within the cable-conductor interface and to be coupled to the first cable conductors, are also electrical interconnects.

15. The smart-cable module of claim 14 wherein the primary-channel interconnects comprise at least twice as many electrical interconnects as the one or more side-band channel interconnects.

16. The smart-cable module of claim 12 wherein the sideband communication circuitry implements, as the side-band communication channel, a wireless radio-frequency (RF) communication channel and the signaling medium other than the first cable conductors comprises any medium through which RF electromagnetic waves may propagate, including ambient space between the respective sideband communication circuits.

17. The smart-cable module of claim 16 wherein the primary communication circuitry implements the primary communication channel in compliance with one or more IEEE 802.3 Ethernet standards and wherein the sideband communication circuitry implements the wireless RF communication channel in accordance with a wireless communication standard.

18. A retimer integrated circuit (IC) comprising:

a first interface to be coupled to a host device;

a second interface to be coupled via first cable conductors to another retimer IC;

a retimer core coupled between the first and second interfaces and having circuitry to implement a primary communication channel over the first cable conductors at least in part by forwarding information received via either of the first and second interfaces to the other; and sideband communication circuitry to implement a side-band communication channel for conveying link management information via a signaling medium distinct from the first cable conductors, wherein the primary communication channel operates in accordance with a first communication protocol and the sideband communication channel operates in accordance with a second communication protocol that is distinct from the first communication protocol, such that the retimer IC supports heterogeneous primary and sideband communication channels.

19. The retimer IC of claim 18 wherein the sideband communication circuitry comprises a register bank in compliance with a Common Management Interface Specification (CMIS) and control circuitry to access the register bank according to content of the link management information.

20. The retimer IC of claim 18 wherein the sideband communication circuitry comprises a communication interface to a wireless radio-frequency (RF) signaling component and control circuitry to transmit and receive the link management information to the wireless RF signaling component for wireless transmission to a counterpart wireless RF signaling component coupled to a communication interface of the other retimer IC.

21. The retimer IC of claim 18 wherein the signaling medium distinct from the first cable conductors comprises one or more other cable conductors to be coupled between the sideband communication circuitry and the other retimer IC.

22. The retimer IC of claim 21 wherein:

the retimer core to implement the primary communication channel over the first cable conductors comprises circuitry to transmit and receive information over the primary communication channel in compliance with one or more IEEE 802.3 Ethernet standards; and the sideband communication circuitry to implement the sideband communication channel comprises circuitry to transmit and receive information over the sideband communication channel either (i) according a proprietary communication protocol or (ii) in compliance with a standards-based communication protocol other than Ethernet.

* * * * *